No. 642,980. Patented Feb. 6, 1900.
H. P. HANDY, Sr.
VEHICLE WHEEL.
(Application filed May 10, 1899.)
(No Model.)
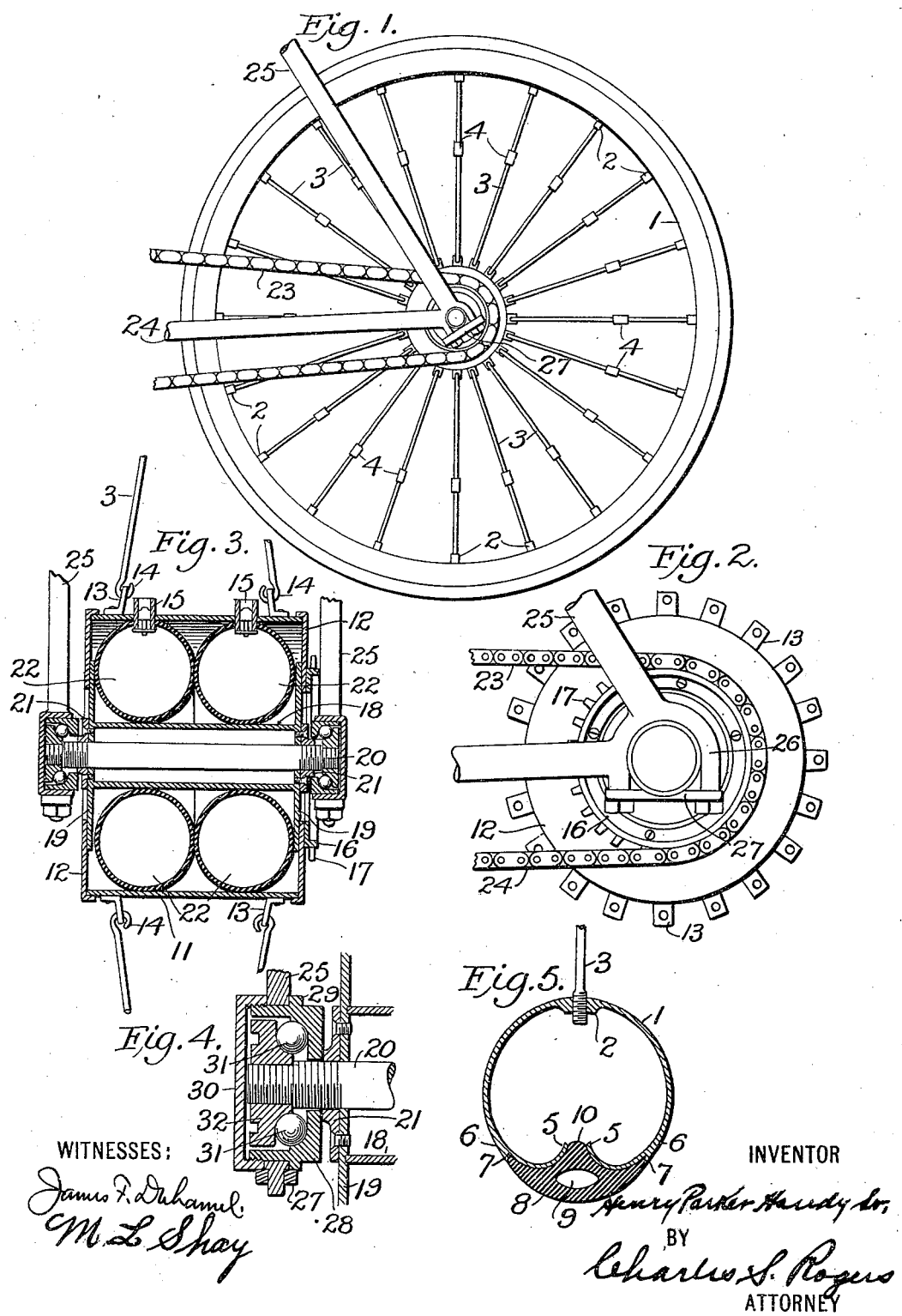
WITNESSES:
James F. Duhamel
M. L. Shay
INVENTOR
Henry Parker Handy Sr.
BY
Charles S. Rogers
ATTORNEY

UNITED STATES PATENT OFFICE.

HENRY PARKER HANDY, SR., OF NAMPA, IDAHO, ASSIGNOR OF ONE-HALF TO LILLIE S. VAN DOREN, OF NEW YORK, N. Y.

VEHICLE-WHEEL.

SPECIFICATION forming part of Letters Patent No. 642,980, dated February 6, 1900.

Application filed May 10, 1899. Serial No. 716,239. (No model.)

*To all whom it may concern:*

Be it known that I, HENRY PARKER HANDY, Sr., a citizen of the United States, residing at Nampa, in the county of Canyon and State of Idaho, have invented certain new and useful Improvements in Vehicle-Wheels; and I do hereby declare the following to be a full, clear, and exact description of the invention, such as will enable others skilled in the art to which it appertains to make and use the same.

This invention relates to vehicle-wheels, and is designed to be used upon bicycles, trotting-sulkies, and automotor-vehicles; and one of the objects of the invention is to provide means for absorbing the concussions or jolting of the vehicle during the passage of the same over obstructions by means of interposed pneumatic cushions constructed in the wheel.

Another object of the invention is to provide means for preventing injury to the wheels by contact with sharp or pointed articles and to provide readily-renewable parts for the wheel which are most subjected to injury and wear.

It is also an object of this invention to produce a cheap and durable wheel embodying lightness in construction and one which can be readily taken apart and put together with the least difficulty.

A further object of the invention is to reduce the friction occurring between the ordinary pneumatic tire of vehicle-wheels and the surface with which the same are in contact occasioned by the flattening of that part of the tire in direct contact with such surface.

With these and other objects in view the invention consists, essentially, in the construction, combination, and arrangement of parts, substantially as hereinafter more fully described in the following specification and illustrated in the accompanying drawings, in which—

Figure 1 represents a side view of a drive-wheel of a bicycle embodying the invention, parts only of the bicycle being shown. Fig. 2 is a detail view of the hub of the same. Fig. 3 is a central transverse section of the hub of the wheel. Fig. 4 is an enlarged detail view of the bearings; and Fig. 5 is an enlarged detail view of the tire and rim or felly, the same being shown in cross-section.

Similar characters of reference designate corresponding parts throughout the several views.

Referring to the drawings, and particularly to Figs. 1 and 5 thereof, the numeral 1 designates the rim or felly of the wheel, preferably constructed of an alloy of aluminium or steel and desirably of the form or construction shown in Fig. 5, but the same may be changed as found desirable in practice. This rim or felly is preferably provided with screw-threaded sockets 2 to receive one end of the spokes 3, having collars 4, by means of which the spokes are tightened, the other end of said spokes being connected with the hub of the wheel, preferably as hereinafter described. The rim or felly is preferably divided longitudinally, so as to leave a circumferential opening or slit, and the free edges 5 of the rim are preferably bent inwardly, so as to contact with each other, as shown in dotted lines in Fig. 5, and the outer surface of the rim is preferably thickened, as shown at 6 in Fig. 5, and is cut away to form V-shaped annular grooves or recesses 7, constructed to receive and retain the inclined edges of the tire 8, which are held securely in position therein and are protected thereby.

The tire 8 may be constructed of any suitable material, although hard rubber is deemed preferable, and the tire is preferably provided with an annular central opening or chamber 9 and with an annular tongue or projection 10, adapted to enter between the free edges 5 of the rim and be securely held by the resiliency thereof.

The tire 8 is preferably made in the form of a continuous band and of slightly less diameter than the felly or rim 1 in order that the same may be sprung upon the rim, and the stretch thereof can be utilized to retain the tire in place upon the rim, and when constructed as before described the tire is noiseless and possesses considerable resiliency without danger of puncture.

It will be understood that the rim or felly 1 must be constructed sufficiently heavy to sustain the load to be carried, and if made of aluminium great lightness will be secured.

By means of the construction before described the flattening of that portion of the tire in direct contact with the surface over which the vehicle is passing is practically eliminated, and the resistance encountered in connection with an ordinary pneumatic tire is thereby eliminated, for if a twenty-eight-inch wheel having the tires inflated sufficiently hard to carry the rider over a smooth surface without materially compressing the same encounters an obstruction that compresses such tire one-half inch it will be found that the tire is flattened on the surface for a distance of about eight inches, and although the return or rebound is almost instantaneous, yet such flattening must retard the speed to some extent.

Referring particularly to Fig. 3 of the drawings, the reference character 11 designates a cylinder or casing preferably having the ends thereof reversely screw-threaded to receive the caps 12, having an open center, and the casing 11 is preferably provided with apertured lugs 13 or with annular rings having openings therein to receive the extremities of the spokes 3, preferably bent to form hooks, as shown at 14, constructed to engage the openings in said lugs, or any other method of attaching the spokes to the casing 11 may be employed, and the casing 11 is preferably provided with tubular ports or openings 15, constructed to receive a valve of any preferred construction, as hereinafter more fully explained.

The spokes 3 of the wheel may be secured to the inner circumference of the rim 1, as before described, and the other end thereof hooked into the lugs or rings upon the casing 11, and by means of the tighteners 4 the casing 11 may be centered and held firmly in position, as will be readily understood.

The caps 12 are preferably provided with a ring 16, having sprocket-teeth 17, and this ring may be preferably of the construction shown and is desirably secured to said caps, around the openings therein, by means of bolts or screws, as shown.

Within the casing 11 is located a movable cylinder or sheath 18, provided with end plates 19, formed integrally therewith or brazed thereto, and said plates are preferably provided with a central bore adapted to receive an axle 20 and are preferably made fast to said axle by means of collars 21, desirably screw-threaded upon said axle, and then bolted to the end plates 19, as shown in Fig. 3 of the drawings. By means of this construction the end plates 19 are made to bear and move upon the inner surface of the caps 12, thus affording the axle and connected parts longitudinal movement within the casing 11, while preventing all lateral movement thereof.

Within the casing 11 and around the sheath 18 are located one or more air-cushions 22, preferably constructed of expansive rubber, although other material may be employed and desirably of such size as to conveniently fill the space between the casing 11 and the sheath 18, as shown in Fig. 3, and these air-cushions are preferably provided with openings constructed to be connected with the tubular valved openings 15 in the casing 11, so that said air-cushions can be inflated from the outside of said casing.

The air-cushions are preferably made continuous or unbroken and when fully expanded they are constructed to bear upon the inner periphery of the casing 11 and on the outer circumference of the sheath 18 with sufficient force to carry their load when not moving without appreciable compression.

It will be understood that the axle 20 is rotated by the force exerted upon the sprocket-wheel 16 through the medium of the sprocket-chain 23, which turns the casing 11, containing the air-cushions 22, which latter, bearing upon the sheath 18 and acting as pulley-bands, rotate said sheath, together with the axle 20, and as the axle and adjacent parts turn together approximately no rotary friction is developed.

The rear fork 24 and stay-fork 25 are preferably provided with a yoke 26, adapted to receive a retaining-plate 27, preferably removably held in position by nuts upon the free ends of said fork, and held in position within said forks are coned bearing-plates 28, preferably provided with an annular exterior rib 29, against which said yoke bears, the orifice of said plate being preferably exteriorly screw-threaded to receive a dust-cap 30, constructed to bear against said yoke and force the same against said rib, as clearly shown in Fig. 4 of the drawings. The coned bearing-plates 28 are preferably provided with a central bore through which passes the axle 20, and said plates desirably bear against the collars 21, but do not rotate with said shaft.

The coned bearing-plates 28 are constructed to receive a ring of steel balls 31, which are held in position thereon by coned bearing-nuts 32, Fig. 4 of the drawings. By means of this construction the shaft 20, nuts 32, sheath 18, air-cushions 22, and casing 11, together with the spokes, rim, and tire, all turn together when actuated by the sprocket-chain 23, as will be readily understood.

The coned bearing-nuts 32 are preferably provided with right and left hand threads and are desirably secured upon the reduced screw-threaded extremity of the axle 20, with which said nuts rotate; but said nuts are preferably constructed in such a manner that they will not rub upon the coned bearing-plates 28, thus throwing all rotary friction upon the balls 31.

It will be understood that the remaining wheel or wheels of the vehicle to which the invention is applied will embody the construction substantially as herein shown and described, and it will only be necessary to describe the invention in connection with a wheel as herein shown.

The operation of the invention will be readily understood from the foregoing description when taken in connection with the accompanying drawings, and further explanation thereof will be unnecessary.

I do not desire to confine myself to the particular construction, combination, and arrangement of parts herein shown and described, and I reserve the right to make all such changes in and modifications of the same as come within the scope and spirit of my invention.

What I claim as new, and desire to secure by Letters Patent, is—

1. A vehicle-wheel provided with a casing, a sheath mounted therein, expansible devices between the casing and sheath, a shaft carried by said sheath journaled in antifriction-bearings in the vehicle-frame, and a rim connected with said casing.

2. A vehicle-wheel provided with a casing connected with a rim, a shaft journaled in antifriction-bearings in the vehicle-frame, a sheath secured to said shaft within said casing, expansible devices between said sheath and casing, constructed to rotate the latter when the former is revolved by said shaft.

3. A vehicle-wheel provided with a casing a rim, a sheath within said casing, a shaft connected with the latter and journaled in bearings in the vehicle-frame, inclined rings upon said casing connected with said rim and expansible devices between said casing and sheath.

4. A vehicle-wheel provided with a rim carrying spokes a casing constructed to be connected with said spokes and an annular sprocket-ring having an inwardly-directed attaching-flange constructed to be secured to the ends of said casing, and means for revolubly supporting the wheel.

5. A vehicle-wheel provided with a rim carrying spokes, a casing constructed to be connected with said spokes and having end caps, a sprocket-ring having an inwardly-directed annular flange constructed to be secured to said caps and means for revolubly supporting said casing.

6. A vehicle-wheel provided with a rim carrying spokes, a casing connected with the latter, a sprocket-ring connected with said casing constructed to receive a sprocket-chain, a sheath carrying a shaft, expansible devices between the sheath and casing and antifriction-bearings in the vehicle-frame for said shaft.

7. A vehicle-wheel provided with a rim carrying spokes, a cylindrical casing connected with the latter, caps inclosing the ends of said casing, a sheath having end plates mounted within said casing and bearing upon said caps, a shaft secured to said sheath having bearings in the vehicle-frame, air-cushions between said sheath and casing and a sprocket-ring secured to said caps.

8. A vehicle-wheel provided with a hub, a shaft having screw-threaded connections therewith and having screw-threaded engagement with a portion of antifriction-bearings mounted in the vehicle-frame.

9. A vehicle provided with a frame having a yoke to receive a retaining-plate, antifriction-bearings retained within said yoke by said plate, and a wheel carrying an axle journaled in said bearings.

10. A vehicle provided with a frame having a yoke constructed to receive antifriction-bearings, a wheel having screw-threaded connection with a shaft mounted in said bearings, said shaft having screw-threaded engagement with a portion of said bearings and means for retaining said bearings in position within said fork.

11. A vehicle provided with a forked frame, bearing-plates within said fork having a collar or rib to prevent the passage thereof through said fork, a wheel carrying a shaft connected with bearing-plates constructed to enter the first bearing-plates antifriction devices between said plates and a cap engaging the first-mentioned plate and bearing against said fork to retain the former in position.

In testimony whereof I have hereunto affixed my signature in presence of two witnesses.

HENRY PARKER HANDY, SENIOR.

Witnesses:
HENRY J. WILTERDING,
ROBERT C. MCKEE.